No. 647,393. Patented Apr. 10, 1900.
B. FRANKLIN.
PIPE COUPLING.
(Application filed Jan. 3, 1900.)
(No Model.)
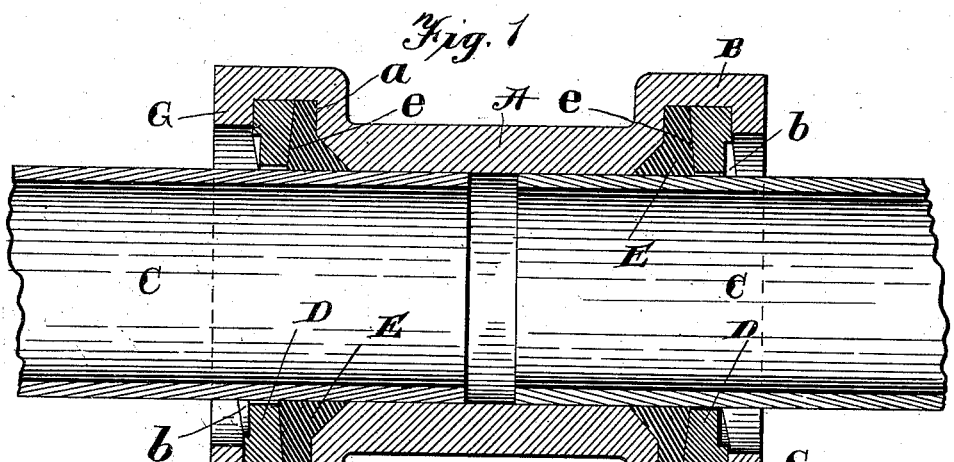
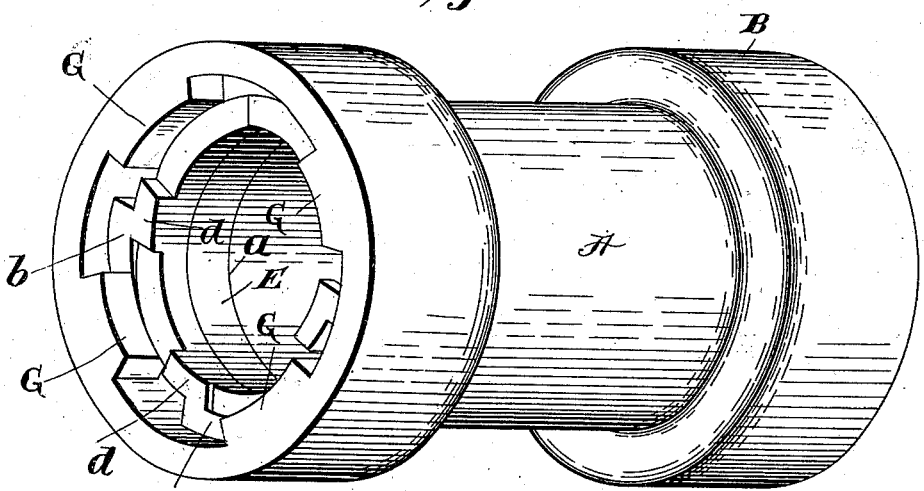
Witnesses
Geo. E. Frech.
Chas. R. Wright Jr.
Inventor
Benjamin Franklin,
by A. S. Pattison,
Attorney.

UNITED STATES PATENT OFFICE.

BENJAMIN FRANKLIN, OF BRADFORD, PENNSYLVANIA, ASSIGNOR TO SOLOMON ROBERT DRESSER, OF SAME PLACE.

PIPE-COUPLING.

SPECIFICATION forming part of Letters Patent No. 647,393, dated April 10, 1900.

Application filed January 3, 1900. Serial No. 247. (No model.)

*To all whom it may concern:*

Be it known that I, BENJAMIN FRANKLIN, a citizen of the United States, residing at Bradford, in the county of McKean and State of Pennsylvania, have invented new and useful Improvements in Pipe-Couplings, of which the following is a specification.

My invention relates to improvements in pipe-couplings, and pertains to a coupling wherein an expansible elastic rubber packing and a compressing-ring is used, the said compressing-ring adapted to expand the rubber in contact with the end of the pipe for making a secure and tight joint, all of which will be fully described hereinafter.

In the accompanying drawings, Figure 1 is a longitudinal sectional view of my coupling, showing it in position and connecting the adjacent ends of two pipe-sections. Fig. 2 is a perspective view of one end of the coupling, showing my invention in position therein. Fig. 3 is a detached perspective view of the compressing-ring.

The object of my invention is to provide a simple means for effecting a secure and tight-joint connection between the adjacent ends of two pipe-sections without the use of the usual screw-and-thread connection.

Referring now to the drawings, A indicates the body of the coupling, which is provided at its opposite ends with oppositely-projecting annular flanges B. These flanges B extend from the ends of the body A in a direction parallel with the body A, and the said flanges form a space around the end of the pipe C that is to be coupled for the reception of a compressing-ring D and an expansible packing E, said packing being preferably composed of rubber.

The ends *a* of the body A constitute annular shoulders, upon which is seated the expansible packing E, and the flanges B are each provided with the inwardly-projecting cam-lugs G.

By reference to Fig. 3 the specific construction of the compressing-ring D will be clearly understood, and it will be noted that this clamping-ring D is provided with the wedge-shaped projections *b*, said wedge-shaped projections situated at the outer periphery or edge of the ring D and adapted to be forced under the lugs or projections G extending from the inner faces of the flanges B. For the purpose of providing means for driving or forcing the compressing-ring around and causing the engagement of the wedge-shaped lugs *b* of the ring and the lugs G of the flanges B, I provide the outer face of the ring D with the lugs or projections *d*. By means of these lugs the compressing-ring can be rotated a slight distance, sufficient to cause the lugs *b* and G to engage and to thereby compress the rubber packing E and force it outward in engagement with the pipe C for making a secure and tight joint.

To more effectively force the rubber packing in engagement with the pipe which it surrounds, the inner face *e* of the ring and the corresponding inner faces of the lugs *b* are inclined outward by making the ring and the lugs thicker at their outer than at their inner edges, and in this way the rubber is compressed more tightly at its outer than at its inner edge, thus more effectively forcing it inward in tight contact with the pipe surrounded thereby. Attention is also directed to the fact that the pipe-section C is of a size to about fit the interior of the body A of the coupling, and to thus practically form a continuation of the two pipe-sections without constituting an enlarged chamber between their ends, and which construction necessitates but a small amount of expansion of the surrounding rubber ring to effect a tight joint, owing to the fact that the rubber ring is of a width and of a diameter about equal to the width of the annular shoulder formed by the end of the body A and of about the same diameter as the said body A.

A coupling of this construction will permit an expansion and contraction of the joint without causing a loosening or a leak therein, and the construction herein shown and described places the compression device and the packing device wholly within the projecting flanges B, which is frequently a great advantage and also a saving in material.

Having thus described my invention, what I claim, and desire to secure by Letters Patent, is—

1. A pipe-coupling comprising a coupling member having at its end a surrounding and longitudinally-projecting flange, an elastic packing-ring resting upon the end of the body, the said longitudinally-projecting flange provided with inwardly-extending lugs removed from and beyond the elastic packing-ring, and a compressing-ring situated within the said longitudinally-extending flange and at a point inside of the inwardly-extending lugs thereof, the compressing-ring and the said flanged lugs having engaging wedge-shaped surfaces, substantially as described.

2. A pipe-coupling comprising a body adapted to receive a pipe-section, the body having at its end a flange projecting longitudinally from the outer edge of the end of the body, an elastic packing-ring seated upon the end of the said body, the said flange provided with inwardly-projecting lugs, and a compressing-ring situated within the flange and resting upon the said packing-ring, the compressing-ring having lugs adapted to engage the lugs upon the flange, said lugs having inclined engaging surfaces, substantially as described.

3. A pipe-coupling comprising a body having at its end a longitudinally-extending surrounding flange, the flange having inwardly-projecting lugs situated at a point beyond the end of the body, an elastic packing-ring seated upon the end of the body and inside of said flange-lugs, a compressing-ring situated outside of the said packing and adapted to compress the same, the compressing-ring provided with cam-shaped lugs engaging the lugs upon the flange, substantially as described.

4. A pipe-coupling comprising a body having at its end a longitudinally-extending and surrounding flange, an elastic packing-ring resting upon the end of the body, a compressing-ring adapted to compress the said elastic packing, the said flange provided with inwardly-projecting lugs situated at a point outside of and removed from the packing-ring, the compressing-ring having its periphery provided with lugs adapted to engage the said flange-lugs, substantially as described.

In testimony whereof I have hereunto set my hand in the presence of two subscribing witnesses.

BENJAMIN FRANKLIN.

Witnesses:
 HERMAN H. NORTH,
 WM. L. GRAHAM.